(12) United States Patent
Li et al.

(10) Patent No.: US 12,573,230 B1
(45) Date of Patent: Mar. 10, 2026

(54) FINGERPRINT RECOGNITION METHOD AND FINGERPRINT RECOGNITION DEVICE

(71) Applicant: SAMSUNG ELECTRONICS CO., LTD., Suwon-si (KR)

(72) Inventors: Hanhui Li, Xi'an (CN); Xiaochun Yan, Xi'an (CN); Chunmiao Jiang, Xi'an (CN); Huaiwen Bai, Xi'an (CN); Jiangbo Chen, Xi'an (CN); Yanjun Chen, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/925,616

(22) Filed: Oct. 24, 2024

(30) Foreign Application Priority Data

Sep. 10, 2024 (CN) .......................... 202411266387.5

(51) Int. Cl.
*G06V 40/12* (2022.01)
*G06V 10/82* (2022.01)

(52) U.S. Cl.
CPC .......... *G06V 40/1353* (2022.01); *G06V 10/82* (2022.01)

(58) Field of Classification Search
CPC ..... G06V 40/1253; G06V 10/82; G06V 40/00
See application file for complete search history.

(56) References Cited

U.S. PATENT DOCUMENTS

| | | | |
|---|---|---|---|
| 8,358,814 B2 | 1/2013 | Monden | |
| 11,144,625 B2 | 10/2021 | Setterberg | |
| 11,430,255 B2 | 8/2022 | Nakvosas | |
| 2018/0025202 A1* | 1/2018 | Ryshtun ............. | G06V 40/1388 382/124 |
| 2022/0318354 A1 | 10/2022 | Park et al. | |
| 2022/0318376 A1 | 10/2022 | Cho et al. | |
| 2022/0319238 A1 | 10/2022 | Kim et al. | |
| 2022/0327189 A1* | 10/2022 | Belli ........................ | G06F 21/32 |
| 2023/0252283 A1* | 8/2023 | Lee ...................... | G06N 3/0464 706/25 |

OTHER PUBLICATIONS

Chugh, et al., "Fingerprint Spoof Buster", arXiv preprint arXiv:1712.04489v1 [cs.CV] Dec. 12, 2017, pp. 1-13.

* cited by examiner

*Primary Examiner* — Lixi C Simpson
(74) *Attorney, Agent, or Firm* — Morgan, Lewis & Bockius LLP

(57) ABSTRACT

A fingerprint recognition method includes receiving an input fingerprint image; dividing the input fingerprint image into M image blocks, wherein M is an integer greater than 1, calculating a score of N image blocks among the M image blocks by inputting successive ones of the M image blocks into a neural network for fingerprint recognition until the score of the N image blocks meets a preset condition, wherein the score is a sum score, and N is an integer less than or equal to M, and terminating calculating the scores of remaining image blocks among the M image blocks, and recognizing a legitimacy of a fingerprint in the input fingerprint image.

20 Claims, 10 Drawing Sheets

FIG. 1

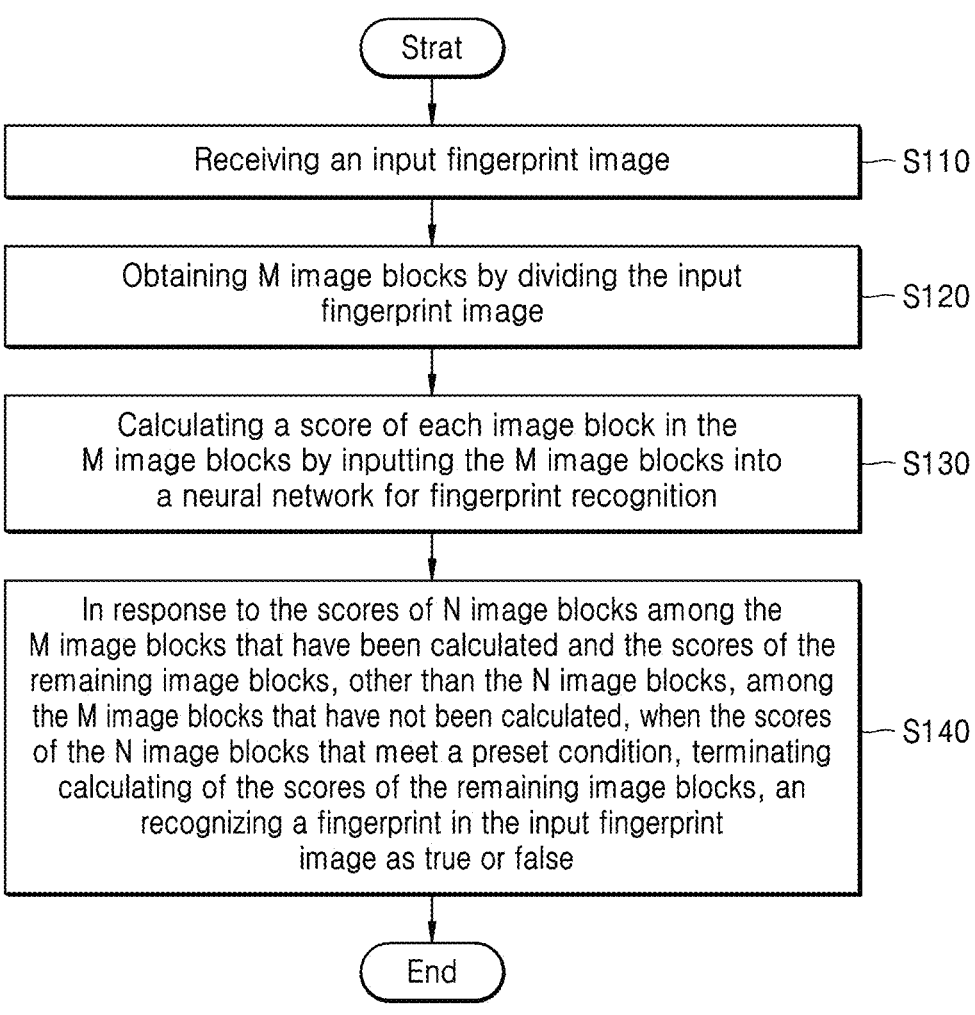

Strat

Receiving an input fingerprint image — S110

Obtaining M image blocks by dividing the input fingerprint image — S120

Calculating a score of each image block in the M image blocks by inputting the M image blocks into a neural network for fingerprint recognition — S130

In response to the scores of N image blocks among the M image blocks that have been calculated and the scores of the remaining image blocks, other than the N image blocks, among the M image blocks that have not been calculated, when the scores of the N image blocks that meet a preset condition, terminating calculating of the scores of the remaining image blocks, an recognizing a fingerprint in the input fingerprint image as true or false — S140

End

FIG. 2
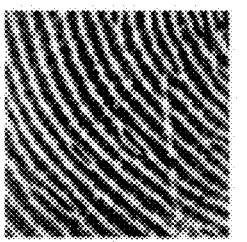 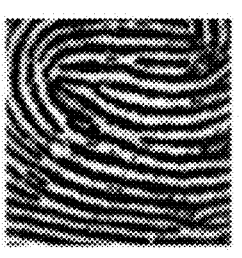 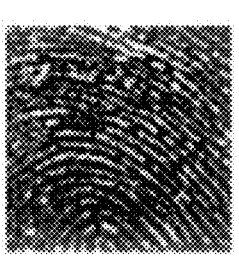 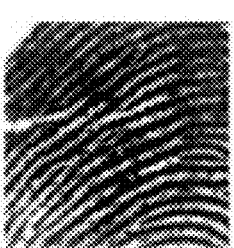
real fingerprint      gelatin      clay      Pareto

400

1

FINGERPRINT RECOGNITION METHOD AND FINGERPRINT RECOGNITION DEVICE

CROSS-REFERENCE TO RELATED APPLICATION

This application is based on and claims priority under 35 U.S.C. § 119 to Chinese Patent Application No. 202411266387.5, filed on Sep. 10, 2024, in the China National Intellectual Property Administration, the disclosure of which is incorporated by reference herein in its entirety.

BACKGROUND

1. Technical Field

The present disclosure relates to image processing, and more specifically, to a fingerprint recognition method and a fingerprint recognition device.

2. Discussion of Related Art

Biometrics are body measurements and calculations related to human characteristics. For example, fingerprint biometrics may be used to authenticate or identify a person. Fingerprint recognition has been widely applied and deployed in authentication scenarios. These authentication scenarios may include high-security applications, such as authentication in the context of financial transactions, smartphone unlocking, and access control.

While fingerprint recognition has high real-time requirements, it is generally deployed in electronic devices with limited resources, such as, embedded devices.

SUMMARY

The inventive concept provides a fingerprint recognition method and a fingerprint recognition device.

In an aspect of the present disclosure, a fingerprint recognition method may include receiving an input fingerprint image, determining a plurality of minutiae appearing in the input fingerprint image, wherein the plurality of minutiae number M, and recognizing a legitimacy of a fingerprint in the input fingerprint image by performing an iterative method comprising obtaining an image block from the input fingerprint image, wherein the image block corresponds to a next one of the plurality of minutiae, calculating a score of the image block by inputting the image block into a neural network for fingerprint recognition, adding the score of the image block to a sum score of each image block previously obtained, such that the sum score is calculated using a plurality of image blocks numbering N, and recognizing the legitimacy of the fingerprint in the input fingerprint image upon the sum score satisfying a preset condition.

In an embodiment, the preset condition may include a first condition, wherein the first condition indicates that a sum score is greater than or equal to a product of M and a preset threshold score, and wherein the recognizing the legitimacy of the fingerprint in the input fingerprint image may include recognizing the fingerprint in the input fingerprint image as true upon the sum score meeting the first condition.

In an embodiment, the preset condition may include a second condition, wherein the second condition indicates that a sum of the sum score and a first value is less than a product of M and a preset threshold value, and the first value is equal to a product of a difference between M and N and a maximum score that the neural network may output, and wherein the recognizing the legitimacy of the fingerprint in the input fingerprint image may include recognizing the fingerprint in the input fingerprint image as false upon the sum score meeting the second condition.

In an embodiment, a fingerprint recognition method may include determining a center coordinate of the input fingerprint image, and determining a first number of image blocks corresponding to a first number of minutiae closest to the center coordinate among the plurality of image blocks and a second number of image blocks corresponding to a second number of minutiae farthest from the center coordinate among the plurality of image blocks as M image blocks, wherein a sum of the first number and the second number is equal to M.

In an embodiment, a fingerprint recognition method may include determining the plurality of minutiae appearing in the input fingerprint image comprises extracting the plurality of minutiae from the input fingerprint image using a feature extraction algorithm, wherein each image block of the plurality of image blocks is centered on a different minutia of the plurality of minutiae.

In one aspect of the present disclosure, a fingerprint recognition method is provided, which comprises receiving an input fingerprint image; dividing the input fingerprint image into M image blocks, wherein M is an integer greater than 1; calculating a score of N image blocks among the M image blocks by inputting successive ones of the M image blocks into a neural network for fingerprint recognition until the score of the N image blocks meets a preset condition, wherein the score is a sum score, and N is an integer less than or equal to M, and terminating calculating the scores of remaining image blocks among the M image blocks, and recognizing a legitimacy of a fingerprint in the input fingerprint image.

In an embodiment, the preset condition includes a first condition, wherein the first condition indicates that a sum of the scores of the N image blocks is greater than or equal to a product of M and a preset threshold score, and wherein the recognizing the legitimacy of the fingerprint in the input fingerprint image comprises: recognizing the fingerprint in the input fingerprint image as true upon the scores of the N image blocks meeting the first condition.

In an embodiment, the preset condition includes a second condition, wherein the second condition indicates that a sum of a sum of the scores of the N image blocks and a first value is less than a product of M and a preset threshold value, and the first value is equal to a product of a difference between M and N and a maximum score that the neural network may output, and wherein the recognizing the legitimacy of the fingerprint in the input fingerprint image as true or false comprises: recognizing the fingerprint in the input fingerprint image as false upon the scores of the N image blocks meeting the second condition.

In an embodiment, the neural network comprises a depthwise separable convolutional network, and the number of output channels of point convolutions of the depthwise separable convolutional network is consistent with multiplication and accumulation operations supported by a fingerprint recognition device performing the fingerprint recognition method.

In an embodiment, the depthwise separable convolutional network includes a separable convolutional structure of which a number of output channels is a predetermined number, wherein the separable convolutional structure includes depth-wise convolutional layers and point-wise convolutional layers, and wherein a convolution operation of the depth-wise convolution layers is accelerated using a convolution hardware accelerator of the fingerprint recognition device, and a convolution operation of the point-wise convolution layers is accelerated using a multiplication and accumulation hardware accelerator of the fingerprint recognition device.

In an embodiment, the obtaining the M image blocks by dividing the input fingerprint image comprises: obtaining a plurality of image blocks by dividing the input fingerprint image; determining a center coordinate of the input fingerprint image; and determining a first number of image blocks closest to the center coordinate among the plurality of image blocks and a second number of image blocks farthest from the center coordinate among the plurality of image blocks as the M image blocks, wherein a sum of the first number and the second number is equal to M.

In an embodiment, the obtaining the plurality of image blocks by dividing the input fingerprint image comprises: extracting a plurality of minutiae from the input fingerprint image using a feature extraction algorithm, wherein each image block of the plurality of image blocks is centered on a different minutia of the plurality of minutiae.

In another aspect, a fingerprint recognition device is provided, which comprises: a receiving module configured to receive an input fingerprint image; an obtaining module configured to obtain M image blocks by dividing the input fingerprint image, wherein M is an integer greater than 1; and a recognition module configured to: calculate a score of N image blocks among the M image blocks by inputting successive ones of the M image blocks into a neural network for fingerprint recognition until the score of the N image blocks meets a preset condition, wherein the score is a sum score, and Nis an integer less than or equal to M, terminate calculating the scores of remaining image blocks among the M image blocks, and recognize a legitimacy of a fingerprint in the input fingerprint image, wherein N is an integer less than or equal to M.

In an embodiment, the preset condition includes a first condition, wherein the first condition indicates that a sum of the scores of the N image blocks is greater than or equal to a product of M and a preset threshold score, and wherein the recognition module is configured to: recognize the legitimacy of the fingerprint in the input fingerprint image as true upon the scores of the N image blocks meeting the first condition.

In an embodiment, the preset condition includes a second condition, wherein the second condition indicates that a sum of a sum of the scores of the N image blocks and a first value is less than a product of M and a preset threshold value, and the first value is equal to a product of a difference between M and N and a maximum score that the neural network may output, and wherein the recognition module is configured to: recognize the legitimacy of the fingerprint in the input fingerprint image as false upon the scores of the N image blocks meeting the second condition.

In an embodiment, the neural network comprises a depth-wise separable convolutional network, and a number of output channels of point convolutions of the depthwise separable convolutional network is consistent with multiplication and accumulation operations supported by the fingerprint recognition device.

In an embodiment, the depthwise separable convolutional network includes a separable convolutional structure of which the number of output channels is a predetermined number, wherein the separable convolutional structure includes depth-wise convolutional layers and point-wise convolutional layers, and wherein a convolution operation of the depth-wise convolution layers is accelerated using a convolution hardware accelerator of the fingerprint recognition device, and a convolution operation of the point-wise convolution layers is accelerated using a multiplication and accumulation hardware accelerator of the fingerprint recognition device.

In an embodiment, the obtaining module is configured to: obtain a plurality of image blocks by dividing the input fingerprint image; determine a center coordinate of the input fingerprint image; and determine a first number of image blocks closest to the center coordinate among the plurality of image blocks and a second number of image blocks farthest from the center coordinate among the plurality of image blocks as the M image blocks, wherein a sum of the first number and the second number is equal to M.

In an embodiment, the obtaining module is configured to: extract a plurality of minutiae from the input fingerprint image using a feature extraction algorithm, wherein each image block of the plurality of image blocks is centered on a different minutia of the plurality of minutiae.

In still one aspect, a fingerprint recognition device may include a processor, and a computer-readable storage medium storing a computer program, which, when executed by the processor, implements a fingerprint recognition method of a recognition module.

BRIEF DESCRIPTION OF THE DRAWINGS

Embodiments will be more clearly understood from the following detailed description taken in conjunction with the accompanying drawings in which:

FIG. 1 shows a flowchart of a fingerprint recognition method according to an example embodiment of the present disclosure.

FIG. 2 shows schematic diagrams of an input fingerprint image corresponding to a real fingerprint, an input fingerprint image corresponding to a fake fingerprint simulated by gelatin, an input fingerprint image corresponding to a fake fingerprint simulated by clay, and an input fingerprint image corresponding to a fake fingerprint simulated by Pareto.

DETAILED DESCRIPTION

Figure 3:
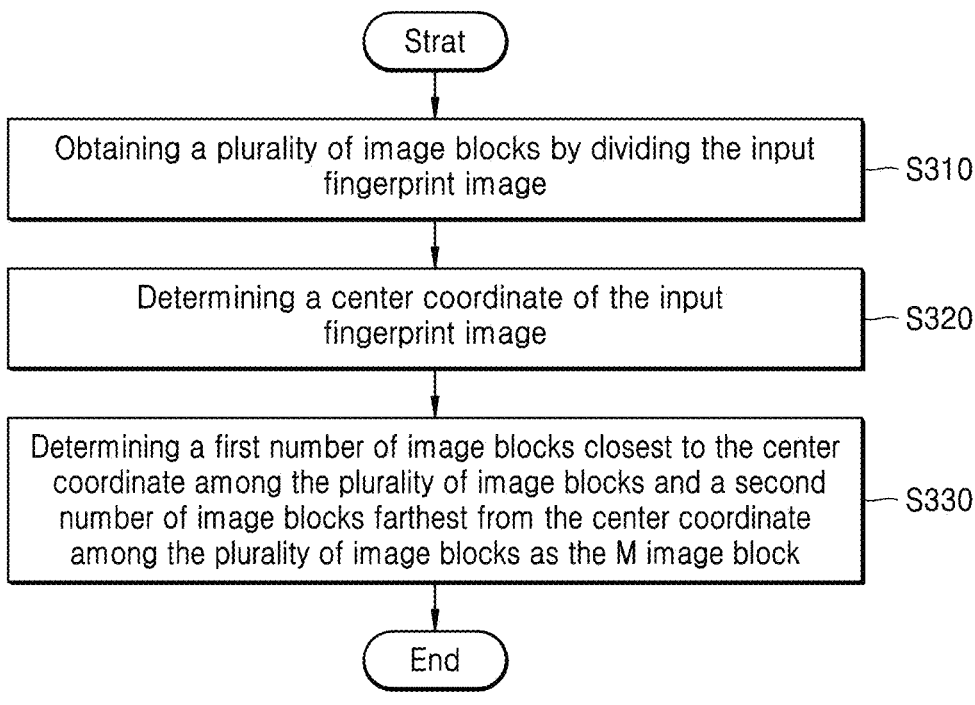
FIG. 3 shows a flowchart of a method of obtaining M image blocks according to an example embodiment of the present disclosure.

The following detailed description is provided to assist the reader in gaining a comprehensive understanding of methods, apparatuses, and/or systems described herein.

However, various changes, modifications, and equivalents of methods, apparatuses, and/or systems described herein will be apparent from the description, or may be learned by practice of embodiments of the disclosure. For example, the sequences of operations described herein are merely examples, and are not limited to those set forth herein, but may be changed as will be apparent from the description. Also, descriptions of features that are known in the art may be omitted for increased clarity or conciseness.

The features described herein may be embodied in different forms and are not to be construed as being limited to the examples described herein. Rather, the examples described herein have been provided merely to illustrate some of the many possible ways of implementing methods, apparatuses, and/or systems described herein that will be apparent from the description.

As used herein, the term "and/or" includes any one of, and any combination of any two or more of, the associated items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in an example described herein may also be referred to as a second member, component, region, layer, or section in another example.

Throughout the specification, when an element (such as a layer, region, or substrate) is described as being "on" another element, "connected to" or "coupled to" another element, the element may be disposed directly "on" the another element, directly "connected to" or "coupled to" the another element, or there may be one or more other elements disposed therebetween. On the contrary, when an element is described as "directly on" another element, "directly connected to" or "directly coupled to" another element, there may be no other components disposed therebetween.

The terms used herein are only for describing various examples and will not be used to restrict the disclosure. Unless the context clearly indicates otherwise, singular forms are also intended to include plural forms. The terms "including", "including", and "having" indicate the presence of stated features, numbers, operations, members, elements, and/or combinations thereof, but do not exclude the presence or addition of one or more other features, numbers, operations, members, elements, and/or their combinations thereof.

Unless otherwise defined, all terms used herein (including technical and scientific terms) have the same meaning as those commonly understood by the ordinary person in the field to which this disclosure belongs after understanding the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, in the description, when it is deemed that a detailed description of a well-known relevant structure or function will lead to a vague interpretation of the present disclosure, such detailed description may be omitted.

Hereinafter, embodiments will be described in detail with reference to the accompanying drawings. The same reference numerals may be used for the same components in the drawings, and redundant descriptions thereof may be omitted. Embodiments may be implemented in various forms and are not limited to examples described herein.

Similar to many security technologies, fingerprint recognition systems may be vulnerable to attack. For example, a common attack method in the context of fingerprint recognition systems includes collecting a user fingerprint, using a material, such as gelatin, wood glue, or clay, to simulate and generate a counterfeit input fingerprint image, and using the counterfeit input fingerprint image to attack the fingerprint recognition systems.

FIG. 1 shows a flowchart of a fingerprint recognition method according to an example embodiment of the present disclosure.

Referring to FIG. 1, in operation S110, an input fingerprint image may be received.

As shown in FIG. 2, the input fingerprint image corresponding to a real fingerprint, an input fingerprint image corresponding to the fingerprint simulated by gelatin, an input fingerprint image corresponding to the fingerprint simulated by clay, and an input fingerprint image corresponding to the fingerprint simulated by Pareto are shown. However, the input fingerprint images of the present disclosure are not limited thereto and may include images corresponding to any counterfeit fingerprint.

In operation S120, M image blocks may be obtained. The M image blocks may be obtained by dividing the input fingerprint image, wherein M is an integer greater than 1.

The M image blocks may be obtained, for example, by dividing the input fingerprint image by dividing an image into squares of equal size, or by dividing total dimensions of the image by a desired number of pieces. However, embodiments are not limited thereto, and the input fingerprint may be divided in any way. Each of the M image blocks may include at least a portion of the information of the input fingerprint image.

A fingerprint image may capture a verity of information. For example, the information may include global features and local features. The global features may include information about a core and a delta of a fingerprint, as well as information about loops and whorls. The local features may include information about ridge characteristics called minutiae. For example, minutiae features may relate to areas where ridges terminate and bifurcate, bridges in ridges, or islands in ridges. These examples are non-limiting, and other minutiae features may be used.

In one example, a plurality of minutiae may be extracted from the input fingerprint image using a feature extraction algorithm. A plurality of image blocks may be obtained having a predetermined size (e.g., a size of K×K, where K is a positive integer). Each image block of the plurality of image blocks may be centered on respective minutiae of the plurality of features. However, the above examples are non-limiting, and the image blocks may be obtained in any way.

A method of obtaining the M image blocks according to an example embodiment of the present disclosure will be described more specifically in conjunction with FIG. 3.

In step S130, a score for each of the M image blocks may be determined. For example, a score for each of the M image blocks may be calculated by inputting the M image blocks into a neural network used for fingerprint recognition.

In one example, the neural network for fingerprint recognition may include a Convolutional Neural Network (CNN). However, this disclosure is not limited thereto, and the neural networks for fingerprint recognition may include any other neural network used for fingerprint recognition.

In one embodiment, the neural network may comprise a depthwise separable convolutional network, and the number of output channels of point convolutions of the depthwise separable convolutional network may be consistent with multiplication and accumulation operations supported by a fingerprint recognition device performing a fingerprint recognition method.

In an embodiment, by enforcing consistency between the number of output channels of point convolutions of the depthwise separable convolutional network and the multiplication and accumulation operations supported by the fingerprint recognition device performing a fingerprint recognition method, the operations of the depthwise separable convolutional network may be performed more quickly with the hardware support of the fingerprint recognition device, and latency may be reduced. The depthwise separable convolutional network according to an example embodiment of the disclosure will be described more specifically conjunction with FIG. 4.

In addition, the depthwise separable convolutional network may include a separable convolutional structure of which the number of output channels is a predetermined number. The separable convolutional structure may include depth-wise convolutional layers and point-wise convolutional layers. A convolution operation of the depth-wise convolution layer may be accelerated using a convolution hardware accelerator of the fingerprint recognition device, and a convolution operation of the point-wise convolution layer may be accelerated using a multiplication and accumulation hardware accelerator of the fingerprint recognition device. The hardware acceleration will be described more specifically in conjunction with FIG. 5 and FIG. 6.

In an embodiment, the convolution operations of the depth-wise convolutional layers in the depthwise separable convolutional network may be accelerated using the convolution hardware accelerator of the fingerprint recognition device, and the convolution operations of the point-wise convolutional layers in the depthwise separable convolutional network may be accelerated using the multiplication and accumulation hardware accelerator of the fingerprint recognition device, and the convolution operations of depth-wise convolutional layers in the depthwise separable convolutional network and the convolution operations of the point-wise convolutional layers in the depthwise separable convolutional network may be performed more quickly with the hardware support of the fingerprint recognition device, and latency may be reduced.

In addition, the score of each image block may indicate the degree to which the image block is recognized as corresponding to a true fingerprint. For example, a higher score of an image block may indicate a greater possibility that the image block is recognized as corresponding to the true fingerprint.

In operation S140, a fingerprint in the input fingerprint image may be recognized as true or false. For example, in response to the scores of N image blocks among the M image blocks that have been calculated and the scores of remaining image blocks, other than the N image blocks, among the M image blocks that have not been calculated, when the scores of the N image blocks meet a preset condition, the calculating of the scores of the remaining image blocks may be terminated, and the legitimacy of a fingerprint in the input fingerprint image may be recognized, wherein N is an integer less than or equal to M.

For example, by reducing a number of scores calculated in the recognition of the legitimacy of the input fingerprint image, a latency of the calculation may be reduced. It should be understood that the recognition of the legitimacy of the input fingerprint image may include recognizing that the input fingerprint image is legitimate (i.e., an image of a true fingerprint) or recognizing that the input fingerprint image is illegitimate (e.g., an image of a false or counterfeit fingerprint).

A fingerprint recognition method according to example embodiments of the present disclosure may determine whether to terminate the calculation of the scores of the remaining image block before calculating the scores for all of the M image block and whether to recognize the legitimacy of the input fingerprint image based on whether the scores of the already calculated image blocks meet one or more preset conditions. Therefore, it may be feasible to recognize the legitimacy of the input fingerprint image without calculating the scores of all the obtained image blocks, which may reduce latency and improve real-time performance.

In an embodiment, the preset condition may include a first condition, wherein the first condition indicates that a sum of the scores of the N image blocks is greater than or equal to a product of M and a preset threshold score. When the scores of the N image blocks meet the first condition, the fingerprint in the input fingerprint image may be recognized as true.

More specifically, when the scores of the N image blocks satisfy the first condition, regardless of the (unknown) scores of the remaining image blocks, other than the N image blocks, among the M image blocks, the average score of the M image blocks will be greater than the preset threshold score, and the fingerprint of the input fingerprint image may be directly returned as true.

In an embodiment, a reduction in the latency and an improvement in the real-time performance may be related to a number of scores not calculated for remaining image blocks based on the first condition where the fingerprint in the input fingerprint image may be recognized as true.

In another embodiment, the preset condition may include a second condition. That is, the preset condition may include one or more conditions. The second condition may indicate that a sum of a sum of the scores of the N image blocks and a first value is less than a product of M and a preset threshold value, and the first value is equal to a product of a difference between M and N and a maximum score that the neural network may output. When the scores of the N image blocks meet the second condition, the fingerprint in the input fingerprint image may be recognized as false.

More specifically, when the scores of N image blocks meet the second condition, regardless of the scores of the remaining image blocks, other than the N image blocks, among the M image blocks (for example, even if the score of each remaining image block is a maximum score that the neural network can output), the average score of the M image blocks may not exceed the preset threshold, and the fingerprint in the input fingerprint image may be directly returned as false.

In an embodiment, a reduction in the latency and an improvement in the real-time performance may be related to a number of scores not calculated for remaining image blocks based on the second condition where the fingerprint in the input fingerprint image may be recognized as false.

Embodiments described herein may be combined. That is, the preset condition may include the first condition and/or the second condition.

According to an example embodiment of the present disclosure, assuming that scores have been calculated for a number of the image blocks, an evaluation of the condition may be used to confirm whether the calculation may be terminated before calculating the scores of the M image blocks, which may reduce a latency of the calculation. Assuming that there are a total of M image blocks that may be calculated and the i-th ($1 <= i <= M$) image block is calculated at present, the score of the i-th image block is $score_i$, the maximum score of the output of the neural network is $score_{MAX}$, and the threshold is T. The judging conditions may be written as follows:

$$\Sigma score_i \geq M*T \tag{1}$$

$$\Sigma score_i + (M-i)*score_{MAX} < M*T \tag{2}$$

In evaluating condition (1) with the calculation of a score for each successive image block, once condition (1) becomes true, then no matter what the score of any subsequent image block is, an average score for the M image blocks will be greater than the threshold, and it may be determined that the fingerprint is true without considering any subsequent image block. Stated another way, in evaluating condition (1) with the calculation of a score for each successive image block, once condition (1) becomes true, condition (1) will not become false, and it may be determined that the fingerprint is true without considering any subsequent image block. Similarly, if condition (2) becomes true, then the average score for the M image blocks will be less than the threshold value, and it may be determined that the fingerprint is false without considering any subsequent image block. Stated another way, in evaluating condition (2) with the calculation of a score for each successive image block, once condition (2) becomes true, condition (2) will not become false, and it may be determined that the fingerprint is false without considering any subsequent image block. This may reduce a run time of the fingerprint recognition device and may not affect the accuracy.

FIG. 3 shows a flowchart of a method of obtaining M image blocks according to an example embodiment of the present disclosure.

Referring to FIG. 3, in step S310, a plurality of image blocks may be obtained by dividing the input fingerprint image.

For example, the number of the plurality of image blocks may be greater than or equal to M. The plurality of image blocks may be obtained by dividing the input fingerprint image. Each of the plurality of the image blocks may include a portion of the information of the input fingerprint image.

In one example, a plurality of minutiae may be extracted from the input fingerprint image. The plurality of minutiae may be extracted from the input fingerprint image by using a feature extraction algorithm. An image block may be obtained by from the input fingerprint image, where the image block is centered on a respective minutia of the plurality of minutiae. For example, an image block may have a predetermined size (e.g., the size of K×L, where K and L may be the same or different positive integers) (i.e., a rectangular block). However, the above described example is only an example, and the plurality of image blocks may be obtained in any way by dividing the input fingerprint image.

In step S320, a center coordinate of the input fingerprint image may be determined.

The center coordinate of the input fingerprint image may be a coordinate corresponding to the center of the input fingerprint image. The coordinate may be a coordinate in any coordinate system. For example, the central coordinate of the input fingerprint image may correspond to the pixels at the center of the input fingerprint image.

In step S330, a plurality of image blocks M may be determined. The plurality of image blocks M may be determined as a first number of image blocks closest to the center coordinate among the plurality of image blocks and a second number of image blocks farthest from the center coordinate among the plurality of image blocks, where a sum of the first number and the second number is equal to M. For example, a third number of images blocks disposed between the first number of image blocks and the second number of image blocks may be excluded.

According to an example embodiment of the present disclosure, compared to determining all of the plurality of image blocks as image blocks that may be applied to a neural network for fingerprint recognition, by determining the plurality of image blocks M as the image blocks that may be applied to the neural network for fingerprint recognition, the information adequacy of image blocks that may be applied to the neural network for fingerprint recognition may be ensured, and may reduce the time required for the neural network for fingerprint recognition to process the image blocks. For example, the information contained in the plurality of image blocks M may not significantly affect the accuracy of the neural network for fingerprint recognition. Further, by selecting less than all of the plurality of image blocks as image blocks that may be applied to a neural network for fingerprint recognition, latency may be reduced and real-time performance may be improved.

While FIG. 1 and FIG. 3 show an example methods, embodiments are not limited thereto. For example, operations performed in the steps may be modified and may be performed in different orders.

For example, in some embodiments, a fingerprint recognition method may include receiving an input fingerprint image at step S110, determining a plurality of minutiae appearing in the input fingerprint image at step S120, wherein the plurality of minutiae number M, and recognizing a legitimacy of a fingerprint in the input fingerprint image at step S130 and step S140. The step of determining the plurality of minutiae appearing in the input fingerprint image may be similar to step S120, except that the M image blocks may be determined as needed for step S130 of calculating a score of a next image block. The legitimacy of the fingerprint in the input fingerprint image may be recognized at step S140 by performing an iterative method including obtaining the next image block from the input fingerprint image at step S310, wherein the image block corresponds to a next one of the plurality of minutiae, at step S140 calculating a score of the image block by inputting the image block into a neural network for fingerprint recognition, adding the score of the image block to a sum score of each image block previously obtained, such that the sum score is calculated using a plurality of image blocks numbering N, and recognizing the legitimacy of the fingerprint in the input fingerprint image upon the sum score satisfying a preset condition.

In an embodiment, the preset condition may include a first condition, wherein the first condition indicates that a sum score is greater than or equal to a product of M and a preset threshold score, and wherein the recognizing the legitimacy of the fingerprint in the input fingerprint image may include recognizing the fingerprint in the input fingerprint image as true upon the sum score meeting the first condition.

In an embodiment, the preset condition may include a second condition, wherein the second condition may indicate that a sum of the sum score and a first value is less than a product of M and a preset threshold value, and the first value is equal to a product of a difference between M and N and a maximum score that the neural network may output, and wherein the recognizing the legitimacy of the fingerprint in the input fingerprint image may include recognizing the fingerprint in the input fingerprint image as false upon the sum score meeting the second condition.

In an embodiment, a fingerprint recognition method may include determining a center coordinate of the input fingerprint image at step S320; and at step S330 determining a first number of image blocks corresponding to a first number of minutiae closest to the center coordinate among the plurality of image blocks and a second number of image blocks corresponding to a second number of minutiae farthest from the center coordinate among the plurality of image blocks as M image blocks, wherein a sum of the first number and the second number is equal to M.

In an embodiment, step S120 may further include determining the plurality of minutiae appearing in the input fingerprint image may include extracting the plurality of minutiae from the input fingerprint image using a feature extraction algorithm, wherein each image block of the plurality of image blocks is centered on a different minutia of the plurality of minutiae. For example, the M image blocks may be obtained as needed for performing step S130, and a latency may be reduced and a real-time performance may be increased.

Figure 4:
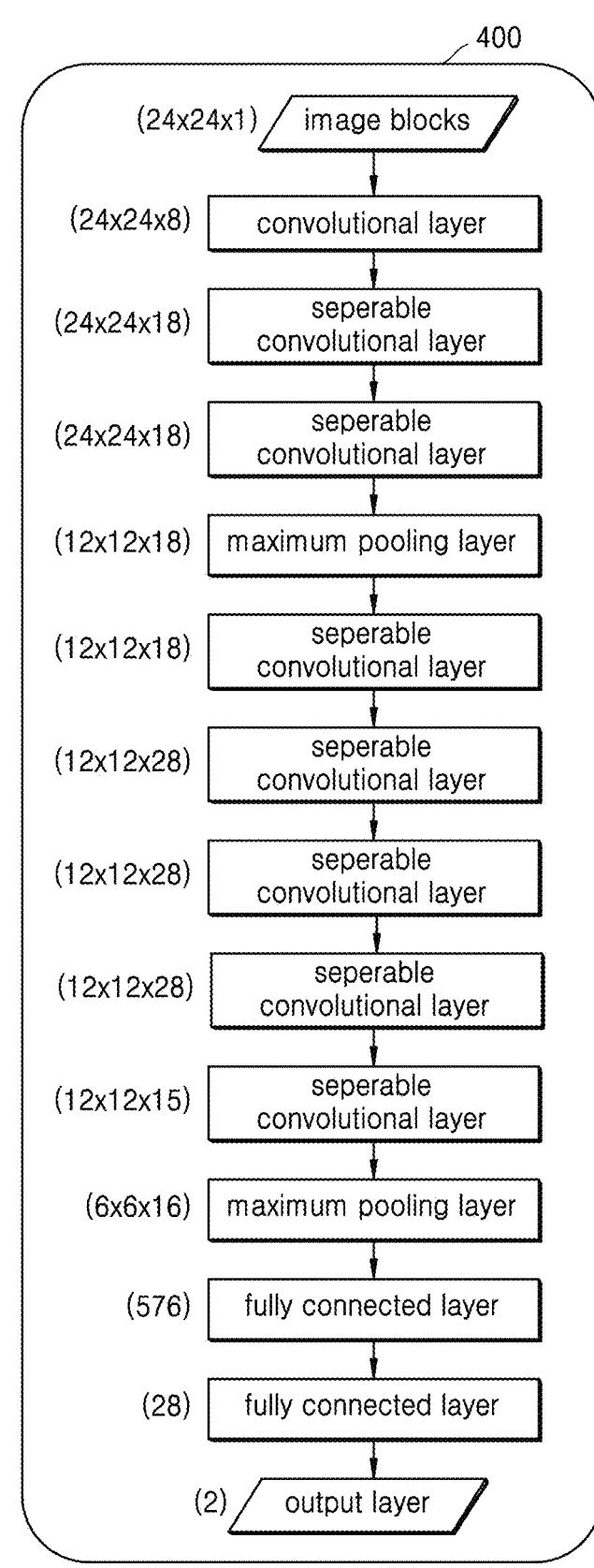
FIG. 4 shows a schematic diagram of a depthwise separable convolutional network according to an example embodiment of the present disclosure.

FIG. 4 shows a schematic diagram of a depthwise separable convolutional network according to an example embodiment of the present disclosure.

Referring to FIG. 4, the depthwise separable convolutional network 400 may include convolutional layers, separable convolutional layers, maximum pooling layers, fully connected layers, and an output layer.

Although FIG. 4 shows an example number and order of the convolution layers, the separable convolution layers, the maximum pooling layers, the fully connected layers, and the output layer, the number and order of the convolution layers, the separable convolution layers, the maximum pooling layers, the fully connected layers, and the output layer of the present disclosure are not limited thereto, and the depthwise separable convolutional network 400 may be variously configured.

In addition, FIG. 4 shows example sizes (e.g., 24×24×8 pixels) of the data processed by the convolution layers, the separable convolution layers, the maximum pooling layers, the fully connected layers, and the output layer, but the size of the data processed by the convolution layers, the separable convolution layers, the maximum pooling layers, the fully connected layers, and the output layer is not limited thereto, and the data processed at each layer may be any other size.

In one example, the depthwise separable convolutional network 400 may use a separable convolutional structure with the number of output channels, for example, 18 output channels or 28 output channels.

Figure 5:
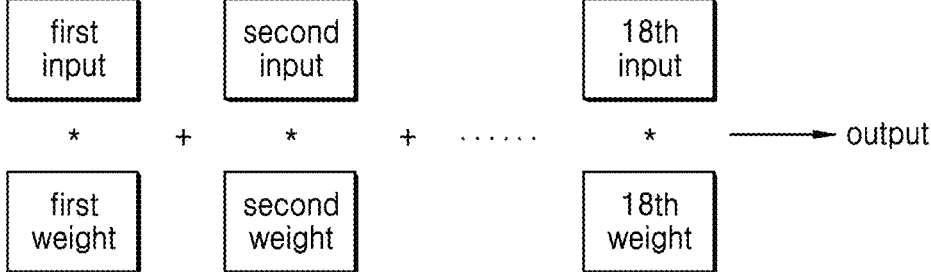
FIG. 5 shows an example of hardware acceleration.

FIG. 5 shows an example of hardware acceleration.

In the example in FIG. 5, the fingerprint recognition device may support multiplication and accumulation (MAC18) hardware acceleration. MAC18 refers to a parallel calculation of dot multiplication and addition of 18 groups of numbers (18 input/weight pairs), which may be used to calculate outputs of the fully connected layers of the convolutional neural network. For example, the number of output channels may be consistent with number of groups in the multiplication and accumulation. In the example of MAC18 hardware acceleration, the number of output channel may be 18.

In one example, the fingerprint recognition device may support hardware acceleration for any other type of MAC operation (e.g., MAC28, MAC216, etc.). In another example, the fingerprint recognition device may support hardware acceleration of 3×3 convolution operations and hardware acceleration of fully connected (FC) layers, and FC layer hardware acceleration methods including, for example, MAC18, MAC28, and MAC216.

Figure 6:
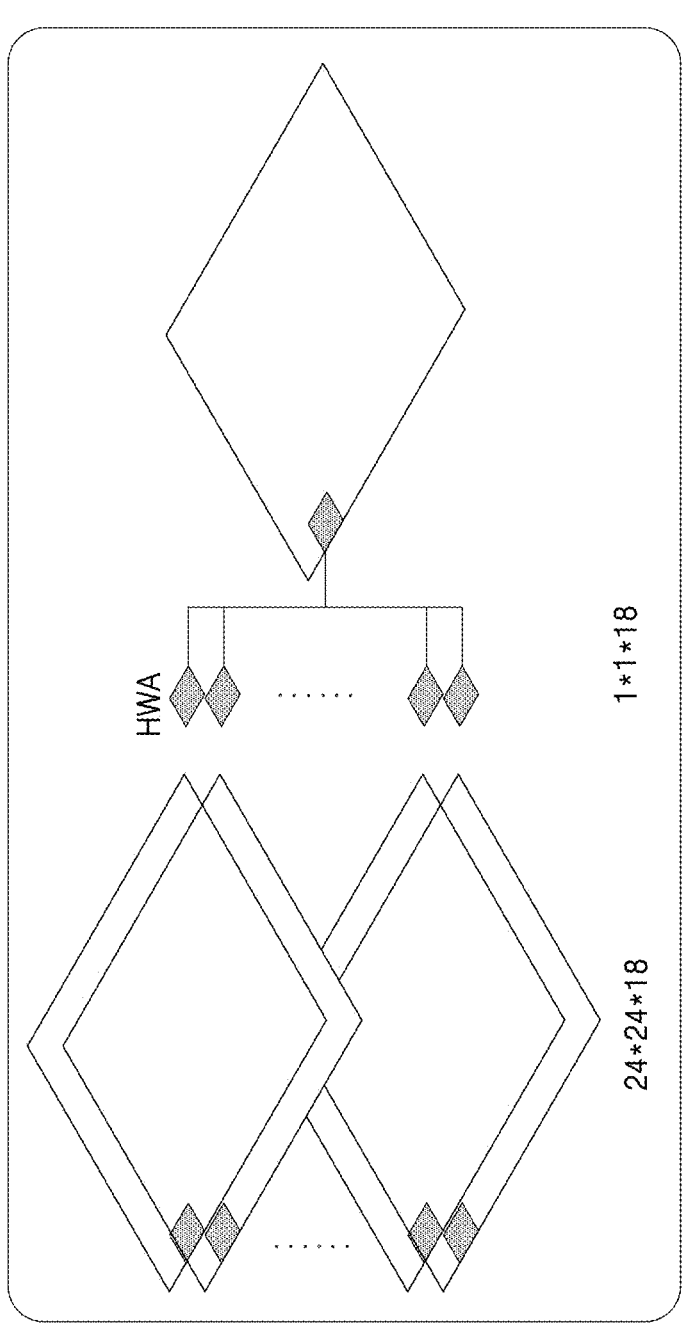
FIG. 6 shows a schematic diagram of point convolution hardware acceleration using MAC18.

FIG. 6 shows a schematic diagram of point convolution hardware acceleration using MAC18.

Referring to FIG. 6, the convolution operations of the point-wise convolutional layers may be accelerated using the multiplication and accumulation hardware accelerator (HWA) of the fingerprint recognition device. For example, through the multiplication and accumulation hardware accelerators, data of 24×24×18 may be processed into data of 1×1×18, and the processing time may be reduced.

Figure 7:
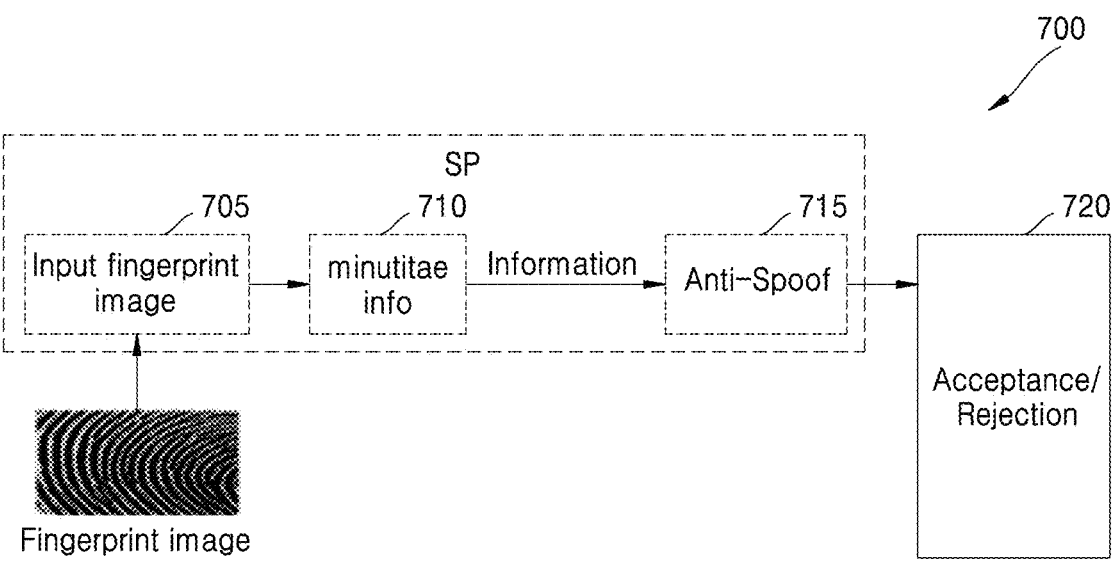
FIG. 7 shows a block diagram of a fingerprint recognition system according to an example embodiment of the present disclosure.

FIG. 7 shows a block diagram of a fingerprint recognition system according to an example embodiment of the present disclosure.

Referring to FIG. 7, the fingerprint recognition system 700 may include an image preprocessor 705, a feature extractor 710, an anti-spoofing module 715, and a matching module 720.

The image preprocessor 705 may receive the input fingerprint image, preprocess the fingerprint image to obtain a gray stretched image, and send the gray stretched image to the feature extractor 710.

The feature extractor 710 may extract features of the preprocessed image to get information (for example, coordinates) of a plurality of minutiae, and send the information of the plurality of minutiae to the anti-spoofing module 715.

The anti-spoofing module 715 may make a discrimination using image blocks centered on M minutiae among the plurality of minutiae, to recognize whether the input fingerprint image is true or false. If the input fingerprint image is true, the anti-spoofing module 715 sends the input fingerprint image to the matching module 720 for matching, and rejects the input fingerprint image if it is false. For example, the anti-spoofing module 715 may be implemented by a neural network for recognizing whether the input fingerprint is true or false. The anti-spoofing module 715 will be described more specifically later in conjunction with FIG. 8.

The matching module 720 may match the image determined as true by the anti-spoofing module 715 with the fingerprint data of a real user registered in a database. The matching may be performed as a check on the discrimination of the anti-spoofing module 715.

Figure 8:
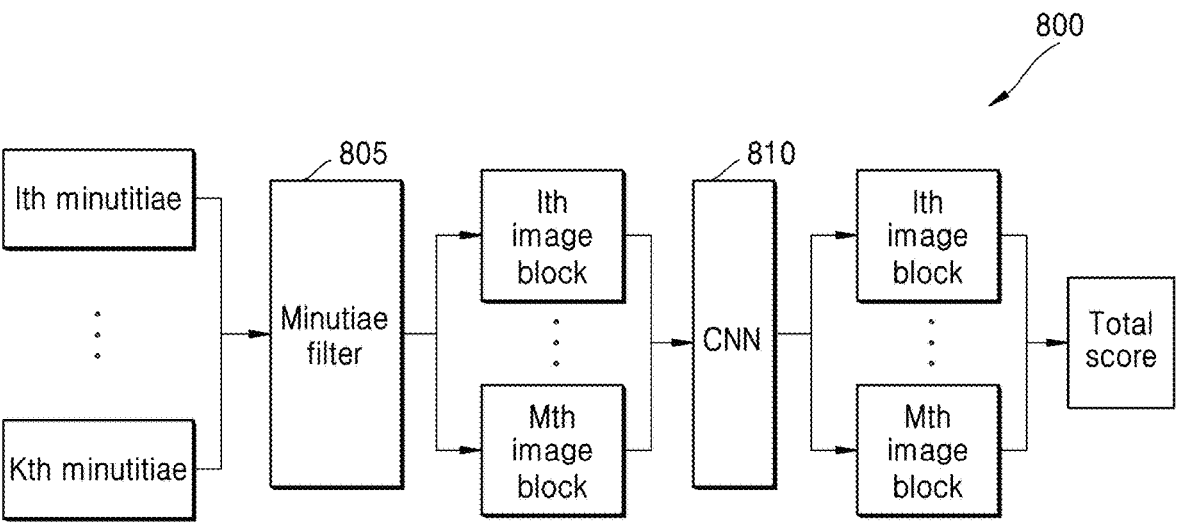
FIG. 8 shows a block diagram of an anti-spoofing module according to an example embodiment of the present disclosure.

FIG. 8 shows a block diagram of an anti-spoofing module according to an example embodiment of the present disclosure.

Referring to FIG. 8, the anti-spoofing module 800 may include a minutia filter 805 and a convolutional neural network (CNN) 810.

The minutia filter 805 may filter out M minutiae from a plurality of minutiae (for example, the first minutia to the Kth minutia), so that M image blocks corresponding to the M minutiae may be obtained.

The convolutional neural network 810 may be used to receive the M image blocks and output M scores based on the M image blocks. The M scores may be used to obtain a total score. For example, the M scores may be summed to obtain a total score. The total score may be used to determine whether the input fingerprint image is true or false.

In another embodiment, the convolutional neural network 810 may be used to perform a fingerprint recognition method. Example fingerprint recognition methods have been described in this application; however embodiments are not limited thereto.

Figure 9:
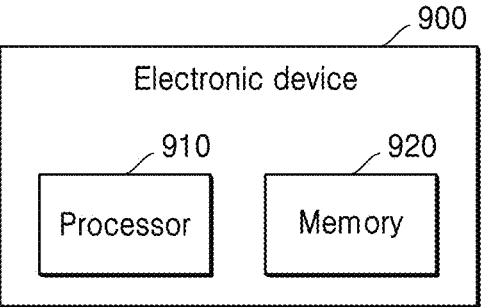
FIG. 9 shows a block diagram of an electronic device according to an example embodiment of the present disclosure.

FIG. 9 shows a block diagram of an electronic device according to an example embodiment of the present disclosure.

Referring to FIG. 9, an electronic device 900 according to embodiments of the present disclosure may include a processor 910 and a memory 920. Here, the memory 920 may store a computer program which, when executed by the processor 910, may perform a fingerprint recognition method described with reference to FIGS. 1 to 8. For brevity, any fingerprint recognition method may be performed by the processor 910 described with reference to FIGS. 1 to 8, and repetitive descriptions thereof may be omitted.

Figure 10:
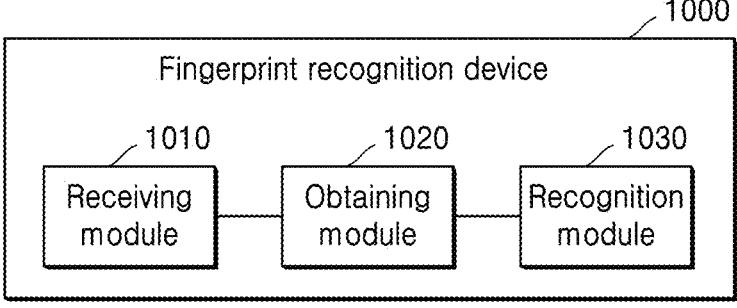
FIG. 10 shows a block diagram of a fingerprint recognition device according to an example embodiment of the present disclosure.

FIG. 10 shows a block diagram of a fingerprint recognition device according to an example embodiment of the present disclosure.

Referring to FIG. 10, the fingerprint recognition device 1000 according to the embodiment of the present disclosure may include a receiving module 1010, an obtaining module 1020, and a recognition module 1030.

The receiving module 1010 may receive an input fingerprint image. The obtaining module 1020 may obtain M image blocks by dividing the input fingerprint image, wherein M is an integer greater than 1. The recognition module 1030 may calculate a score of each image block in the M image blocks by inputting the M image blocks into a neural network for fingerprint recognition. The recognition module 1030 may calculate a score each of N image blocks among the M image blocks by inputting successive ones of the M image blocks into a neural network for fingerprint recognition until the scores of the successive image blocks meet a preset condition. These successive image blocks may be the N image blocks. The recognition module 1030 may terminate calculating the scores of the remaining image blocks, and recognize a fingerprint in the input fingerprint image as true or false, wherein N is an integer less than or equal to M.

The steps to receive the input fingerprint image, the steps to obtain the M image blocks, and the steps to recognize the fingerprint in the input fingerprint image have been described elsewhere herein, so for brevity, repetitive descriptions of the individual processes performed by the receiving module 1010, the obtaining module 1020, and the recognition module 1030 may be omitted.

In addition, a method according to an exemplary embodiment of the present disclosure may be implemented as a computer program in a computer-readable recording medium. Those skilled in the art may implement a computer program in accordance with the present description. A fingerprint recognition method of the present disclosure may be implemented when the computer program is performed in a computer.

According to exemplary embodiments of the present disclosure, a computer-readable storage medium on which a computer program is stored, which, when executed by a processor, causes the processor to implement any of the methods disclosed in the present application may be provided. For example, when the computer program is executed by the processor, the processor may perform the following steps: receiving an input fingerprint image; dividing the input fingerprint image into M image blocks, wherein M is an integer greater than 1; calculating a score of N image blocks among the M image blocks by inputting successive ones of the M image blocks into a neural network for fingerprint recognition until the score of the N image blocks meet a preset condition, wherein the score is a sum score, and N is an integer less than or equal to M, and terminating calculating the scores of remaining image blocks among the M image blocks, and recognizing a legitimacy of a fingerprint in the input fingerprint image.

According to a fingerprint recognition method of example embodiments of the present disclosure, it is possible to determine whether to terminate the calculation of the remaining image block scores in advance and whether to recognize the legitimacy of the input fingerprint image based on whether scores of the already calculated image blocks meet the preset conditions while calculating the scores of the image blocks. Therefore, it may be feasible to recognize the legitimacy of the input fingerprint image without calculating the scores of all the obtained image blocks, which may reduce latency and improve real-time performance.

According to a fingerprint recognition method of example embodiments of the present disclosure, by enforcing consistency between the number of output channels of point convolutions in the depthwise separable convolutional network and the multiplication and accumulation operations supported by the fingerprint recognition device that performs a fingerprint recognition method, the operations of the depthwise separable convolutional network may be performed more quickly with the hardware support of the fingerprint recognition device, and a latency may be reduced.

According to a fingerprint recognition method of example embodiments of the present disclosure, by enforcing the convolution operations of the depth-wise convolutional layers in the depthwise separable convolutional networks may be accelerated using the convolution hardware accelerator of the fingerprint recognition device, and the convolution operations of the point-wise convolutional layers in the depthwise separable convolutional networks may be accelerated using the multiplication and accumulation hardware accelerator of the fingerprint recognition device, the convolution operations of the depth-wise convolutional layers in the depthwise separable convolutional networks and the convolution operations of the point-wise convolutional layers in the depthwise separable convolutional networks may be performed more quickly with the hardware support of the fingerprint recognition device, and a latency may be reduced.

According to a fingerprint recognition method of example embodiments of the present disclosure, the delay may be reduced and the real-time performance may be by terminating the calculation of additional scores based on the first condition and the fingerprint in the input fingerprint image may be recognized as legitimate without calculating the scores of remaining image blocks.

According to example embodiments of the present disclosure, the delay may be reduced and the real-time performance may be ensured because the calculation of scores may be terminated in advance based on the second condition and the fingerprint in the input fingerprint image may be recognized as false without calculating the scores of all image blocks.

In addition, it should be understood that the individual units in an apparatus according to an exemplary embodiments of the present disclosure may be implemented as hardware components and/or software components. According to the processes performed by the defined individual units, those skilled in the art may implement the individual units, for example, using field programmable gate arrays (FPGAs) or application-specific integrated circuits (ASICs).

Although the present disclosure includes specific examples, it will be apparent to those skilled in the art that various changes in form and detail may be made in these examples without departing from the spirit and scope of the claims and their equivalents. The examples described herein should be considered descriptive only and not for the purpose of limitation. The description of a feature or aspect in each example shall be considered applicable to similar features or aspects in other examples. A suitable result may be achieved if the described techniques are performed in a different order, and/or if the components of the described system, architecture, device or circuit are combined in a different manner, and/or replaced or supplemented by other components or their equivalents. Accordingly, the scope of disclosure is not limited by the detailed description, but by the claims and their equivalents, and all changes within the scope of the claims and their equivalents shall be construed to include the disclosure.

What is claimed is:

1. A fingerprint recognition method comprising:
receiving an input fingerprint image;
determining a plurality of minutiae appearing in the input fingerprint image, wherein the plurality of minutiae number M; and
recognizing a legitimacy of a fingerprint in the input fingerprint image by performing an iterative method comprising:
obtaining an image block from the input fingerprint image, wherein the image block corresponds to a next one of the plurality of minutiae;
calculating a score of the image block by inputting the image block into a neural network for fingerprint recognition;
adding the score of the image block to a sum score of each image block previously obtained, such that the sum score is calculated using a plurality of image blocks numbering N; and
recognizing the legitimacy of the fingerprint in the input fingerprint image upon the sum score satisfying a preset condition.

2. The fingerprint recognition method according to claim 1, wherein the preset condition includes a first condition,
wherein the first condition indicates that a sum score is greater than or equal to a product of M and a preset threshold score, and
wherein the recognizing the legitimacy of the fingerprint in the input fingerprint image comprises:
recognizing the fingerprint in the input fingerprint image as true upon the sum score meeting the first condition.

3. The fingerprint recognition method according to claim 1, wherein the preset condition includes a second condition,
wherein the second condition indicates that a sum of the sum score and a first value is less than a product of M and a preset threshold value, and the first value is equal to a product of a difference between M and N and a maximum score that the neural network may output, and
wherein the recognizing the legitimacy of the fingerprint in the input fingerprint image comprises:
recognizing the fingerprint in the input fingerprint image as false upon the sum score meeting the second condition.

4. The fingerprint recognition method according to claim 1, further comprising:
determining a center coordinate of the input fingerprint image; and determining a first number of image blocks corresponding to a first number of minutiae closest to the center coordinate among the plurality of image blocks and a second number of image blocks corresponding to a second number of minutiae farthest from the center coordinate among the plurality of image blocks as M image blocks, wherein a sum of the first number and the second number is equal to M.

5. The fingerprint recognition method according to claim 4, wherein determining the plurality of minutiae appearing in the input fingerprint image comprises extracting the plurality of minutiae from the input fingerprint image using a feature extraction algorithm,
wherein each image block of the plurality of image blocks is centered on a different minutia of the plurality of minutiae.

6. A fingerprint recognition method comprising:
receiving an input fingerprint image;
dividing the input fingerprint image into M image blocks, wherein M is an integer greater than 1;
calculating a score of N image blocks among the M image blocks by inputting successive ones of the M image blocks into a neural network for fingerprint recognition until the score of the N image blocks meets a preset condition, wherein the score is a sum score, and N is an integer less than or equal to M; and
terminating calculating the scores of remaining image blocks among the M image blocks, and recognizing a legitimacy of a fingerprint in the input fingerprint image.

7. The fingerprint recognition method according to claim 6, wherein the preset condition includes a first condition,
wherein the first condition indicates that a sum of the scores of the N image blocks is greater than or equal to a product of M and a preset threshold score, and
wherein the recognizing the legitimacy of the fingerprint in the input fingerprint image comprises:
recognizing the fingerprint in the input fingerprint image as true upon the scores of the N image blocks meeting the first condition.

8. The fingerprint recognition method according to claim 6, wherein the preset condition includes a second condition,
wherein the second condition indicates that a sum of the scores of the N image blocks and a first value is less than a product of M and a preset threshold value, and the first value is equal to a product of a difference between M and N and a maximum score that the neural network may output, and
wherein the recognizing the legitimacy of the fingerprint in the input fingerprint image comprises:
recognizing the fingerprint in the input fingerprint image as false upon the scores of the N image blocks meeting the second condition.

9. The fingerprint recognition method according to claim 6, wherein the neural network comprises a depthwise separable convolutional network, and a number of output channels of point convolutions of the depthwise separable convolutional network is consistent with multiplication and accumulation operations supported by a fingerprint recognition device performing the fingerprint recognition method.

10. The fingerprint recognition method according to claim 9, wherein the depthwise separable convolutional network includes a separable convolutional structure of which the number of output channels is a predetermined number,
wherein the separable convolutional structure includes depth-wise convolutional layers and point-wise convolutional layers, and wherein a convolution operation of the depth-wise convolution layers is accelerated using a convolution hardware accelerator of the fingerprint recognition device, and a convolution operation of the point-wise convolution layers is accelerated using a multiplication and accumulation hardware accelerator of the fingerprint recognition device.

11. The fingerprint recognition method according to claim 6, wherein the dividing of the input fingerprint image into the M image blocks comprises:

obtaining a plurality of image blocks by dividing the input fingerprint image;

determining a center coordinate of the input fingerprint image; and determining a first number of image blocks closest to the center coordinate among the plurality of image blocks and a second number of image blocks farthest from the center coordinate among the plurality of image blocks as the M image blocks, wherein a sum of the first number and the second number is equal to M.

12. The fingerprint recognition method according to claim 11, wherein the obtaining the plurality of image blocks by dividing the input fingerprint image comprises:

extracting a plurality of minutiae from the input fingerprint image using a feature extraction algorithm, wherein each image block of the plurality of image blocks is centered on a different minutia of the plurality of minutiae.

13. A fingerprint recognition device comprising:

a receiving module configured to receive an input fingerprint image;

an obtaining module configured to obtain M image blocks by dividing the input fingerprint image, wherein M is an integer greater than 1; and a recognition module configured to calculate a score of N image blocks among the M image blocks by inputting successive ones of the M image blocks into a neural network for fingerprint recognition until the score of the N image blocks meets a preset condition, wherein the score is a sum score, and N is an integer less than or equal to M, terminate calculating the scores of remaining image blocks among the M image blocks, and recognize a legitimacy of a fingerprint in the input fingerprint image, wherein N is an integer less than or equal to M.

14. The fingerprint recognition device according to claim 13, wherein the preset condition includes a first condition, wherein the first condition indicates that a sum of the scores of the N image blocks is greater than or equal to a product of M and a preset threshold score, and wherein the recognition module is configured to:

recognize the legitimacy of the fingerprint in the input fingerprint image as true upon the scores of the N image blocks meeting the first condition.

15. The fingerprint recognition device according to claim 13, wherein the preset condition includes a second condition, wherein the second condition indicates that a sum of a sum of the scores of the N image blocks and a first value is less than a product of M and a preset threshold value, and the first value is equal to a product of a difference between M and N and a maximum score that the neural network may output, and wherein the recognition module is configured to:

recognize the legitimacy of the fingerprint in the input fingerprint image as false upon the scores of the N image blocks meeting the second condition.

16. The fingerprint recognition device according to claim 13, wherein the neural network comprises a depthwise separable convolutional network, and a number of output channels of point convolutions of the depthwise separable convolutional network is consistent with multiplication and accumulation operations supported by the fingerprint recognition device.

17. The fingerprint recognition device according to claim 16, wherein the depthwise separable convolutional network includes a separable convolutional structure of which the number of output channels is a predetermined number, wherein the separable convolutional structure includes depth-wise convolutional layers and point-wise convolutional layers, and wherein a convolution operation of the depth-wise convolution layers is accelerated using a convolution hardware accelerator of the fingerprint recognition device, and a convolution operation of the point-wise convolution layers is accelerated using a multiplication and accumulation hardware accelerator of the fingerprint recognition device.

18. The fingerprint recognition device according to claim 13, wherein the obtaining module is configured to:

obtain a plurality of image blocks by dividing the input fingerprint image;

determine a center coordinate of the input fingerprint image; and determine a first number of image blocks closest to the center coordinate among the plurality of image blocks and a second number of image blocks farthest from the center coordinate among the plurality of image blocks as the M image blocks, wherein a sum of the first number and the second number is equal to M.

19. The fingerprint recognition device according to claim 18, wherein the obtaining module is configured to:

extract a plurality of minutiae from the input fingerprint image using a feature extraction algorithm, wherein each image block of the plurality of image blocks is centered on a different minutia of the plurality of minutiae.

20. The fingerprint recognition device according to claim 13, further comprising:

a processor; and a computer-readable storage medium storing a computer program, which, when executed by the processor, implements a method of the recognition module.

* * * * *